United States Patent [19]

Ackeret

[11] 4,266,834
[45] May 12, 1981

[54] FILING ARRANGEMENT

[75] Inventor: Peter Ackeret, Küsnacht, Switzerland

[73] Assignee: Licinvest AG, Chur, Switzerland

[21] Appl. No.: 2,959

[22] Filed: Jan. 12, 1979

[30] Foreign Application Priority Data

Jan. 20, 1978 [DE] Fed. Rep. of Germany ....... 2802459

[51] Int. Cl.³ .................... A47B 81/06; F16B 12/00
[52] U.S. Cl. .......................................... 312/8; 312/9;
312/12; 312/111; 312/183; 206/387
[58] Field of Search ................... 312/8, 9, 12, 15, 16,
312/17, 18, 19, 107, 108, 111, 183; 206/387;
220/339

[56] References Cited

U.S. PATENT DOCUMENTS

| 1,150,674 | 8/1915 | Grunewald | 312/183 |
|---|---|---|---|
| 1,259,602 | 3/1918 | Clark | 312/12 |
| 2,665,808 | 1/1954 | McAlister | 312/183 |
| 2,868,606 | 1/1959 | Stierna | 312/9 |
| 2,907,618 | 10/1959 | Rostau | 312/111 |
| 3,287,075 | 11/1966 | Batke et al. | 312/111 |
| 3,408,126 | 10/1968 | Mortensen | 312/183 |
| 3,476,455 | 11/1969 | Barecki et al. | 312/8 |
| 3,620,367 | 11/1971 | Stembel | 206/387 |
| 3,703,326 | 11/1972 | Riviers | 312/111 |
| 3,710,900 | 1/1973 | Fink | 206/387 |
| 3,899,229 | 8/1975 | Ackeret | 312/111 |
| 3,974,898 | 8/1976 | Tullis et al. | 312/111 |
| 3,999,818 | 12/1976 | Schankler | 312/111 |
| 4,026,615 | 5/1977 | Tazaki et al. | 312/12 |
| 4,124,261 | 11/1978 | Klaus | 312/183 |

FOREIGN PATENT DOCUMENTS 1226682  7/1960  France ......................................... 312/8

Primary Examiner—Victor N. Sakran
Attorney, Agent, or Firm—H. Dale Palmatier

[57] ABSTRACT

The invention relates to a filing arrangement for cassettes which are intended and designed to store photographic prints.

12 Claims, 19 Drawing Figures

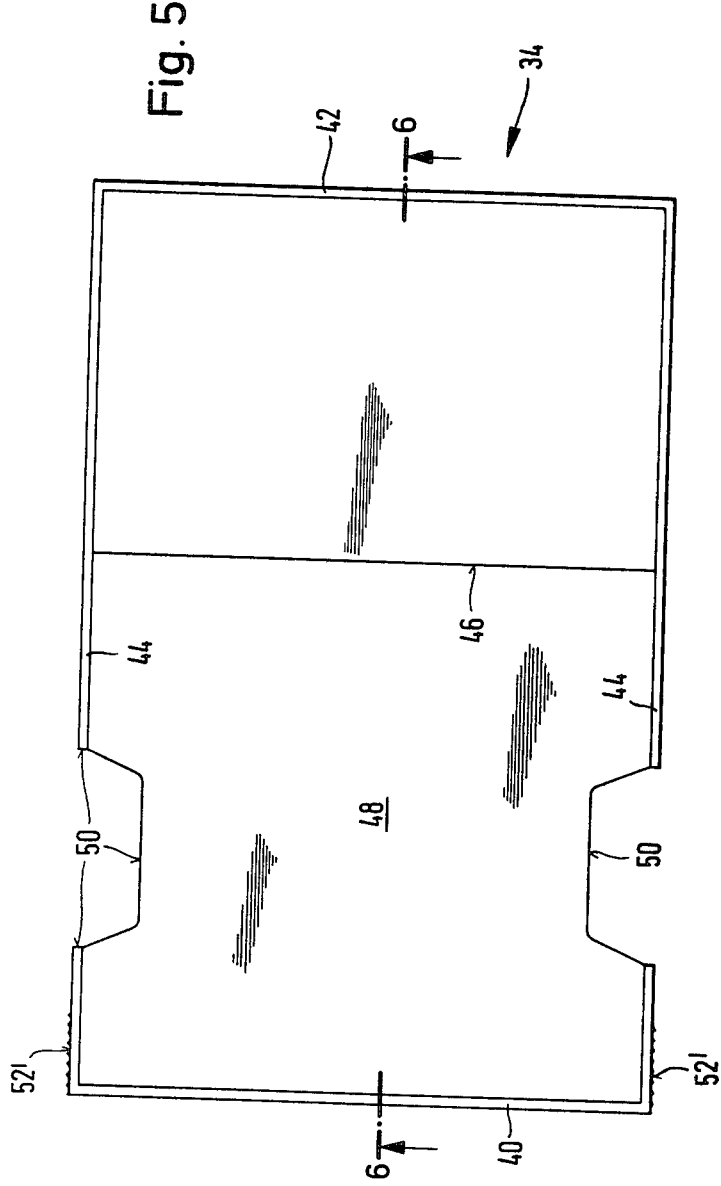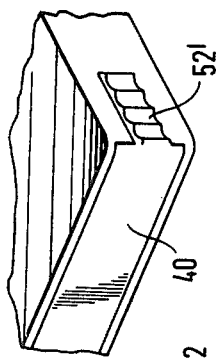

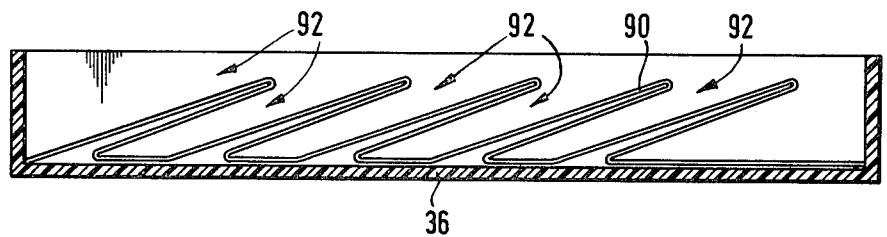
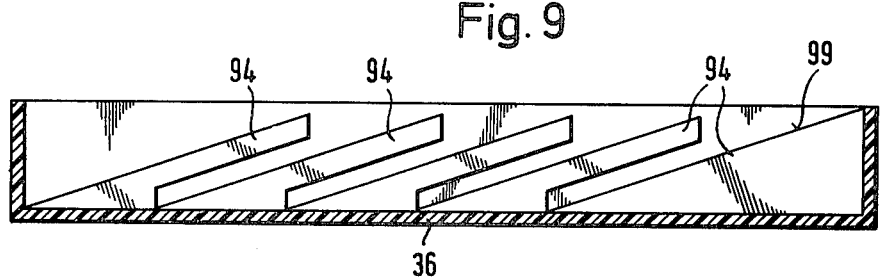
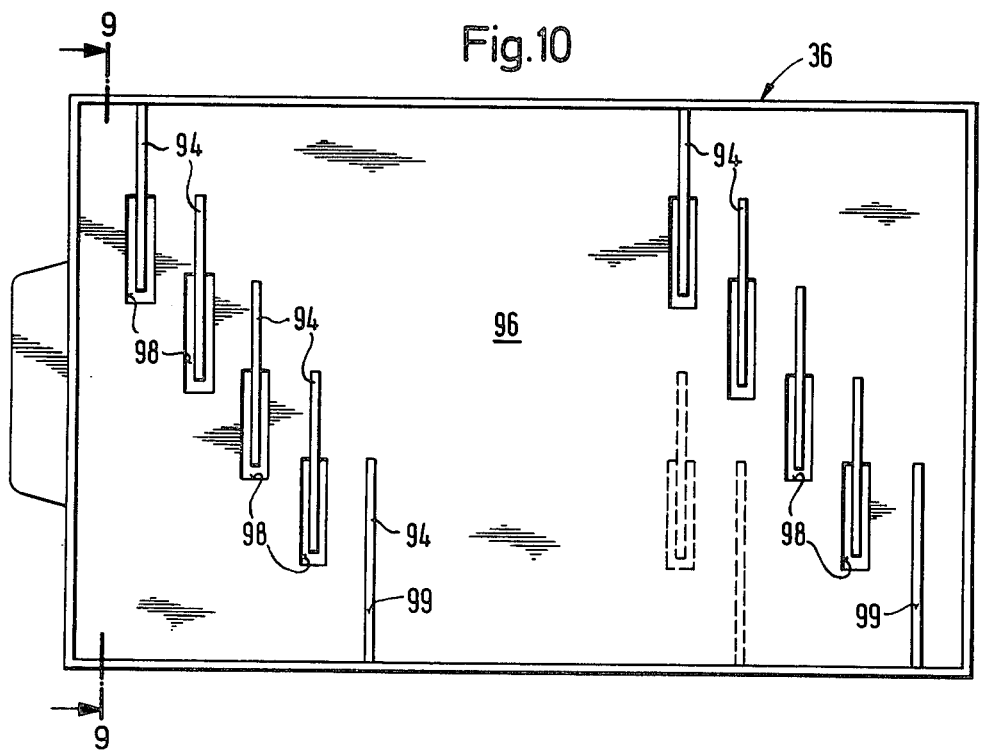

9×9

9×11,5

9×13

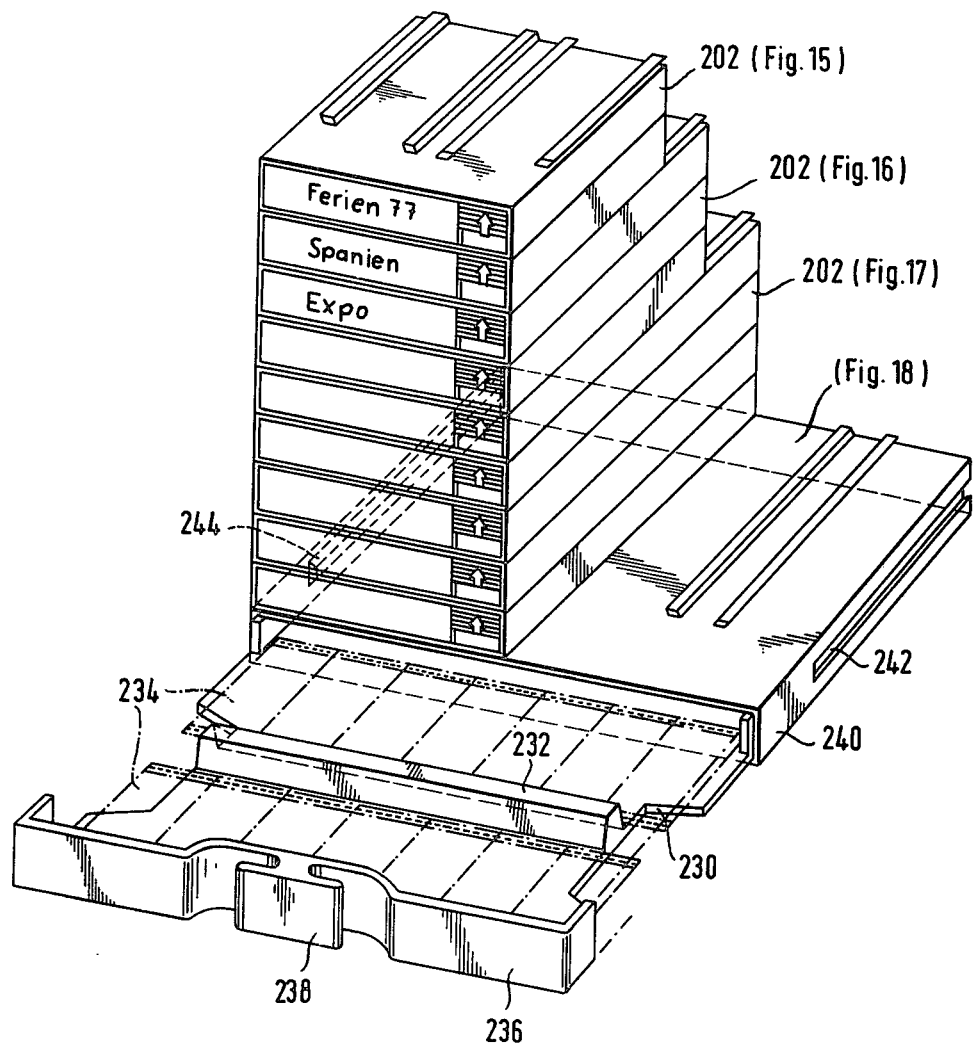

FILING ARRANGEMENT

Proposals have already been made to store photographic prints in cassettes designed especially for this purpose instead of in the conventional photograph albums. Such cassettes may be designed as so-called "change-over viewers", in which, by moving a slider member, all the pictures of a stack are presented in succession for viewing. A design in which the slider member is at the same time a drawer, by means of which the complete stack may be removed from a cassette housing, is an especially advantageous design.

These cassettes relieve the user of the task of arranging and glueing the prints into albums. However, in addition to the positive prints, he also receives the negatives of his film, for the storage of which there are, as a general rule, no suitable arrangements available. The same applies to those prints which for some reason or other are not to be housed in the cassettes, but are nevertheless to be kept, for instance surplus or duplicate prints or those prints of which an enlargement of a portion of the negative is arranged in the cassette, and the like.

It is the task of the invention to provide a combined filing arrangement for all data carriers accumulated by photography, especially for the ordered storage of photo cassettes, together with the pertinent negatives and prints, wherein it shall be possible to extend the arrangement as desired in accordance with the amount of material to be filed.

SUMMARY OF THE INVENTION

In the shelving elements provided according to the invention, which may, if desired, in their turn be assembled from component parts, there is space for in each case a certain number of photo cassettes, which are normally of the same width and height whereas their depth may vary depending on the format of the photographs. The height of the photo cassettes will in practice be dimensioned such that the prints in each case of a complete negative film, which is commercially available for the relevant format, can be accommodated and the dimensions of the filing arrangement according to the invention will also be selected in a corresponding manner, that is to say, in such a manner that in each case one drawer which has space for all the associated negatives is allocated to a specific number of compartments housing the cassettes. For the user, such a filing arrangement is not only more practical in use and less time-consuming than conventional photograph albums, but does not need to be more expensive than these, even with the same capacity, if plastics parts are used for the shelving elements, a factor which will in any case be preferable for such articles.

Examples of the embodiments of the subject of the invention are illustrated in the drawings and are explained in detail below.

FIG. 1 shows a perspective view of a shelving element,

FIG. 2 shows a perspective view of a block comprising four shelving elements shown in FIG. 1, FIG. 3 is a perspective view of the assembly of a shelving element consisting of three different basic units, FIG. 4 is a perspective view of a shelving element in a second embodiment for photographic prints of different sizes, FIG. 5 is a plan view of a drawer for photographic prints, FIG. 6 is a section through the drawer along the line 6—6 of FIG. 5, FIG. 7 is a perspective view of the corner by which the drawer shown in FIGS. 5 and 6, inserted in a shelving element, is gripped, FIG. 8 is a section through a drawer for negatives, FIG. 9 is a section through a drawer for negatives in a different embodiment, along the line 9—9 of FIG. 10, FIG. 10 is a plan view of the drawer shown in FIG. 9, FIGS. 11 and 12 are transverse and longitudinal section views respectively taken at 11—11 of FIG. 12 and 12—12 of FIG. 11 and showing a drawer for negatives, similar to that shown in FIGS. 9 and 10, but inserted into a shelving element and having an ejection mechanism, FIG. 13 is a perspective view of a shelving element with the drawer for negatives open, and FIG. 14 is a perspective view of a further embodiment.

FIG. 19 is a perspective view of a number of shelving elements of FIGS. 14–18 assembled together.

Figure 1:
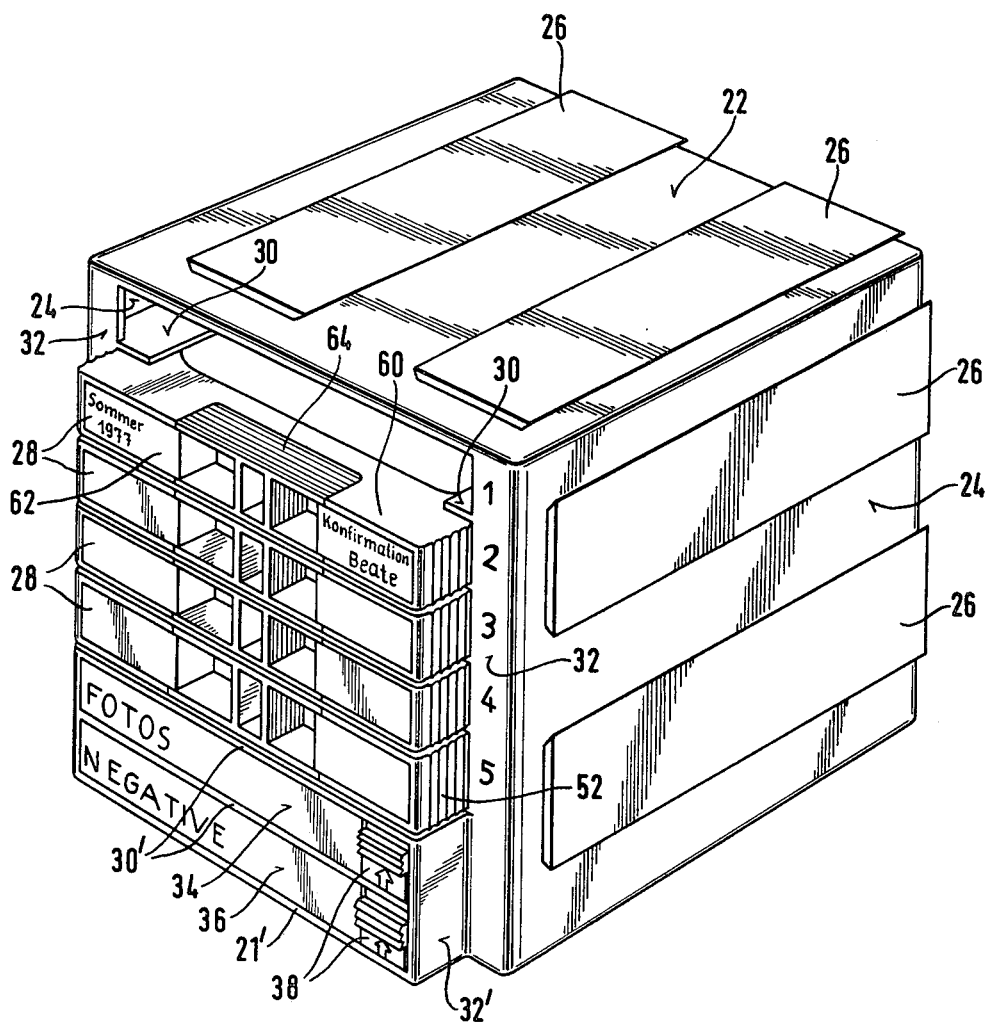
Figure 2:
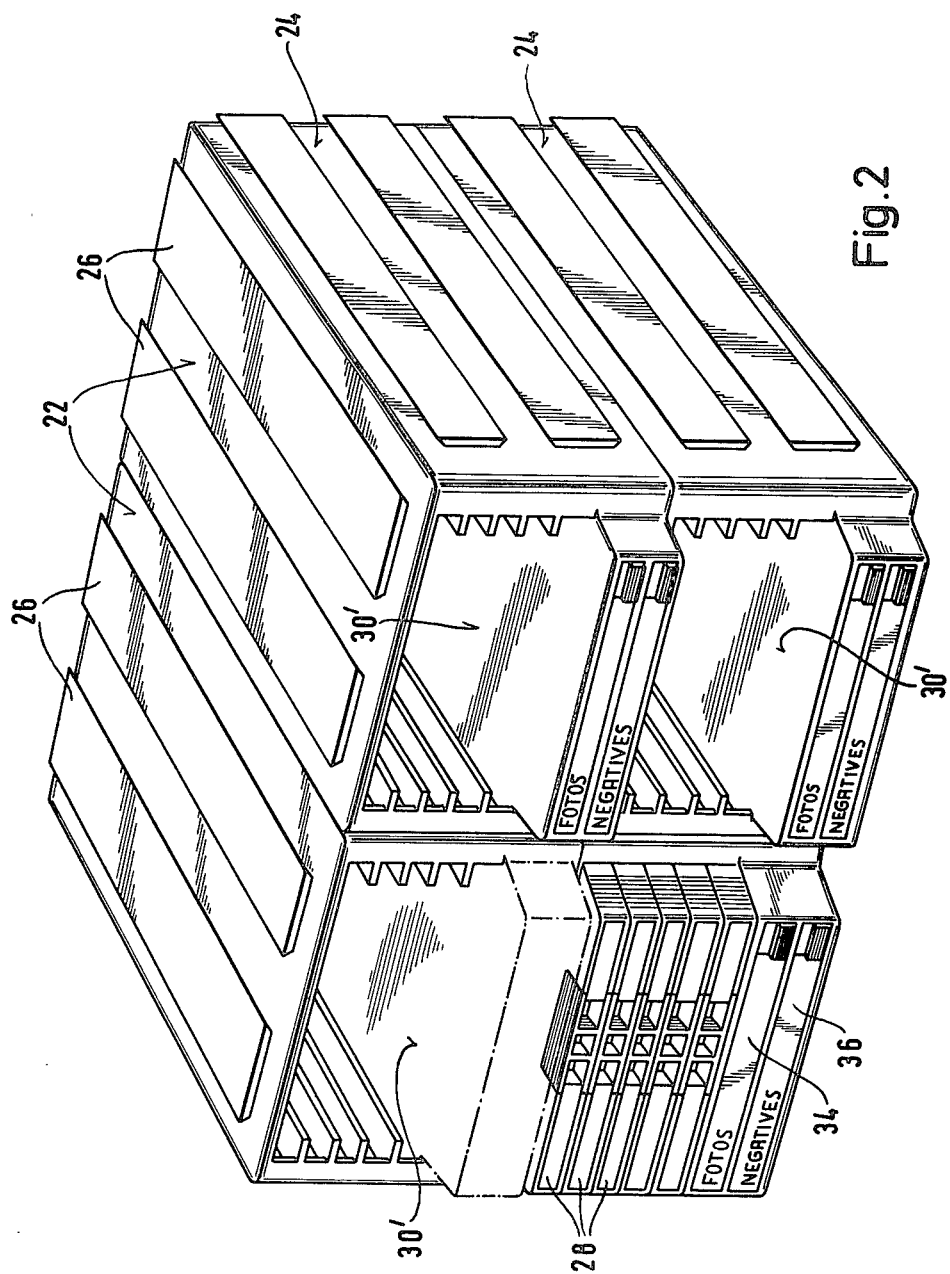

The shelving element shown in FIG. 1 consists of a framework having a top 22, side walls 24 and—not visible in the drawing—a back and a base. The top 22 and the one side wall 24 are provided with projecting ribs 26 of dovetail cross-section, whereas the other side wall 24 and the base have grooves shaped in a complementary manner to the ribs; this enables similar shelving elements to be joined together to form blocks, as may be seen from FIG. 2.

In the embodiment shown in FIG. 1, each shelving element has five compartments for the insertion of cassettes 28. The compartments are separated from one another by lateral ledges 30 that project into the interior of the shelving elements and are somewhat wider than would actually be necessary for accommodating the cassettes 28, that is to say, they are wider by the width of the front edge sections 32. These edge sections are provided with numbers, in this case from 1 to 5, allocated to the compartments. Their chief function is to ensure that, in the case of shelving blocks shown in FIG. 2, each individual cassette 28 can still be gripped laterally and pulled out of the shelving element.

There are two drawers 34 and 36 below the five compartments. The uppermost drawer is intended to accommodate duplicates of prints, reject pictures and the like, while the lower drawer is intended and designed to accommodate negatives. The drawers are each provided with a release button 38, on the actuation of which the drawer is ejected by a spring into a position allowing the contents to be easily removed. Stops (not shown) limit the extent of the ejection movement; the construction of such drawers is known per se and is applied to tape cassette containers that are commercially available. In the region of these drawers the edge sections 32, the base and the ledges 30 are each lengthened by projecting portions 32', 21' and the two ledges are supplemented to form complete dividing shelves 30', the external contours of the framework surrounding the drawers and which is formed in this manner is thus flush with the cassettes 28 inserted above it into the compartments.

The cassettes are designed as frameworks having a change-over mechanism. For the purpose of the explanation of the present invention, it is sufficient to note that such a cassette—called a "change-over viewer"—comprises in its turn a housing part 60 and a sliding part 62 which may be moved backwards and forwards relative to the housing part. On each movement cycle, the photographic print of a pile of prints which is visible at the top in the housing is replaced by the second uppermost or the lowermost print on the pile. In this operation, the housing is held at its end facing away from the slider member end and the slider member is held by means of a pull 64.

Change-over viewers will be manufactured only in sizes for a few selected formats of photographic prints, of which the formats "A" (9 cm × 13 cm), "B" (9 cm × 11.5 cm) and "C" (9 cm × 9 cm) have become accepted as the standard formats. The shelving elements and cassettes of the embodiments illustrated are matched to these dimensions. All cassettes thus have the same width, corresponding to the measurement of 9 cm, but the change-over viewers at least will be made in the three different lengths, corresponding to the formats "A", "B" and "C".

It is furthermore preferred that the shelving elements shall be constructed to accommodate change-over viewers of all three formats. There are then, in principle, two possibilities:

(1) The depth of the compartments corresponds to the overall length of the change-over viewer for the smallest format "C"; the longer change-over viewers then project forward out of the compartments.

(2) The depth of the compartments corresponds to the overall length of the change-over viewer for the largest format "A", and behind the shorter change-over viewers there is an empty space in the compartment.

Since, on the other hand, each cassette must fit into each compartment and, is to be locked there to its housing, and its control button is to be operated by means of the control cam, there is an interaction between the construction of the shelving elements and the construction of the change-over viewer. The design mentioned above under (2) is illustrated in FIGS. 1 and 2.

Figure 3:
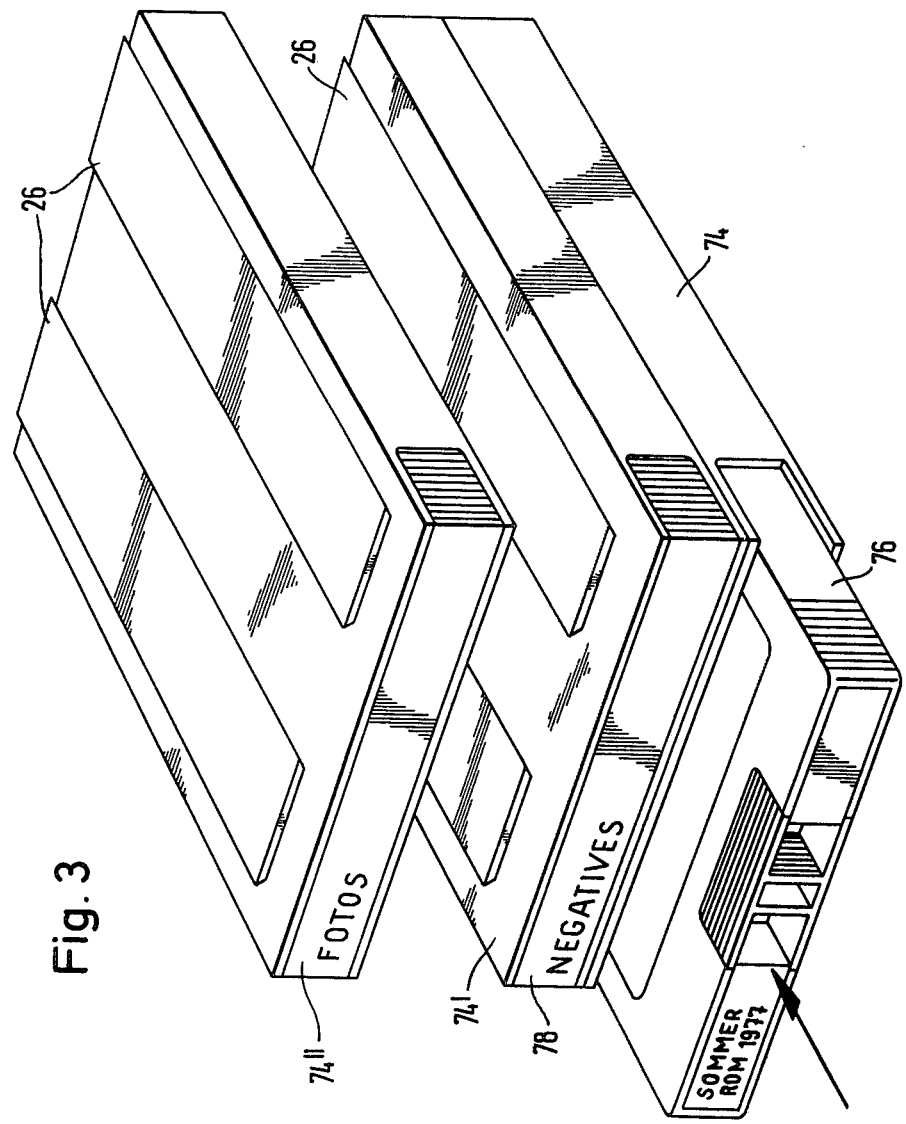

For this case, it is possible, for example, to assemble the shelving elements from individual basic units, wherein it is also possible to dispense with the lateral rails and grooves interlocking to form a stack. In this case the cassettes or drawers do not then need to be narrower than the shelving elements. Such a construction is shown in FIG. 3. Here, a first basic unit 74 out of which a change-over viewer 76 has been partially pulled, is already joined to a second basic unit 74' accommodating a drawer 78, while a third basic unit 74", likewise having a drawer, is shown ready to be pushed onto the shelving element made up of the basic units 74, 74'.

Figure 4:
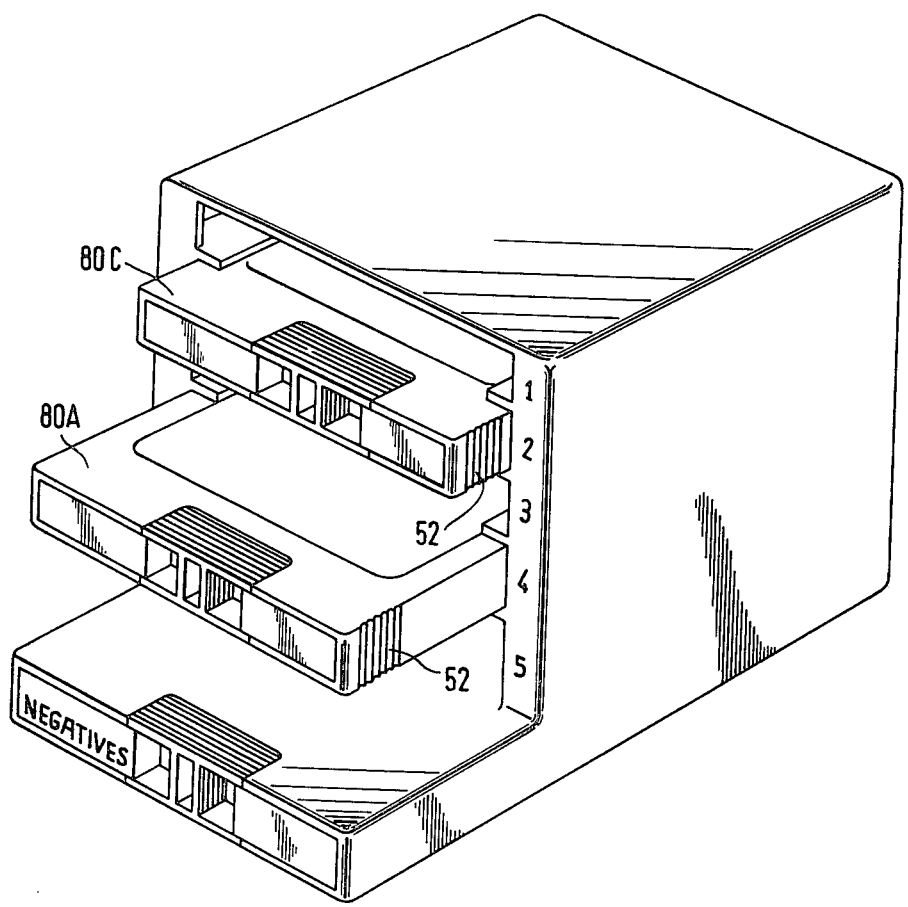

FIG. 4 shows in a perspective view an embodiment of a shelving element for accommodating change-over viewers of different lengths, in which the depth of the compartment is matched to the shortest size of change-over viewer. The compartments 1 to 5 are, as in the case of the embodiment shown in FIGS. 1 and 2, intended to accommodate change-over viewers, below them the shelving element has one compartment having projecting portions of framework and a drawer for negatives.

In the second compartment from the top there is inserted a change-over viewer 80 C, and in the fourth compartment from the top a change-over viewer 80 A. The first projects sufficiently far out of the compartment for its housing to be gripped at the lateral milled strips 52, while the latter, in accordance with its longer length, projects further out of the compartment.

It is obvious that the shelving element need not necessarily be designed to accommodate change-over viewers having a control button. It is possible, for example, to insert only that part of a change-over viewer into the compartments that accommodates a pile of photographic prints if the change-over viewer is so designed that the housing and the slider member can be separated, or if the cassettes have no change-over mechanism at all.

An embodiment of a drawer 34 is illustrated in FIGS. 5 to 7. It is constructed as a type of slide-in base and has an end plate 40, a back plate 42, side plates 44 and a base plate 48 that is stepped at 46. The side plates and the base plate are provided laterally with cut-away portions 50 so that the photographic prints can be easily gripped; the structure is so dimensioned that photographic prints of the dimensions 9 cm × 13 cm (format "A" in FIG. 6) just fit inside. In this way, also prints of format "B" (9 cm × 11.5 cm) can be accommodated and gripped at the cut-away portions 50, whilst prints of the size 9 cm × 9 cm ("C") can be gripped easily only when they are placed in the deeper recess limited by the step 46. So that the drawer can be pulled out, it is provided with milled gripping strips 52', the design of which may vary somewhat from that of the gripping strips 52 in FIG. 1.

Whereas the drawer 34 intended to accommodate surplus photographic prints may have the above-described construction, the drawers 36 for the negative film strips are provided with divisions which serve to coordinate the individual negatives with the cassettes in the compartments. Accordingly, for example one shelving element with five compartments for photographic print cassettes has one drawer for negatives, in which in turn there may be formed five separate piles of film strips, Examples of embodiments for such drawers are illustrated in FIGS. 8 to 13.

The negative films are generally returned by a printing firm in strips of four small picture negatives each, together with the prints. Each strip then has a length of about 145 mm, and is therefore somewhat longer than one format "A" photographic print. The opportunity to construct the drawers for the negatives with an inside length of, for example, 150 mm therefore presents itself, and the strips can then lie in the drawer in a direction parallel to the direction in which the drawer is pulled out.

The drawer 36, shown in FIG. 8 in section at right angles to the direction in which the drawer is pulled out, is divided by an inserted folded strip 90 made of card or similar material into inclined pockets 92 for the film strips. However, as shown in FIGS. 9 and 10, the drawer 36 may alternatively be injection-moulded in one piece from plastics material, and inclined dividing strips 94 can be moulded on at the same time; for reasons connected with injection-moulded techniques, apertures 98 are then provided in the base 96 of the drawer below the self-supporting ends of the strips 94, and this can be seen more clearly from the perspective view shown in FIG. 13. The inclined arrangement permits the volume of the drawer to be used advantageously so that it can be made shallow and the strips can be easily removed.

The space beneath the inclined upper edge 99, however, remains empty. It may be used, therefore to house an ejector spring for the drawer.

Figure 11:
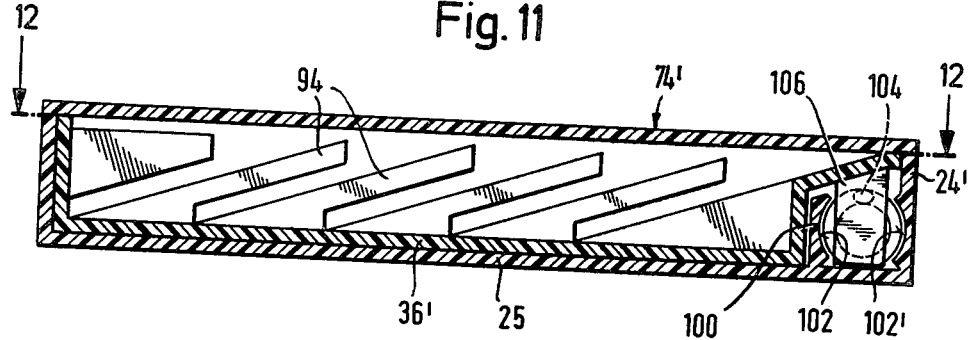
Figure 12:
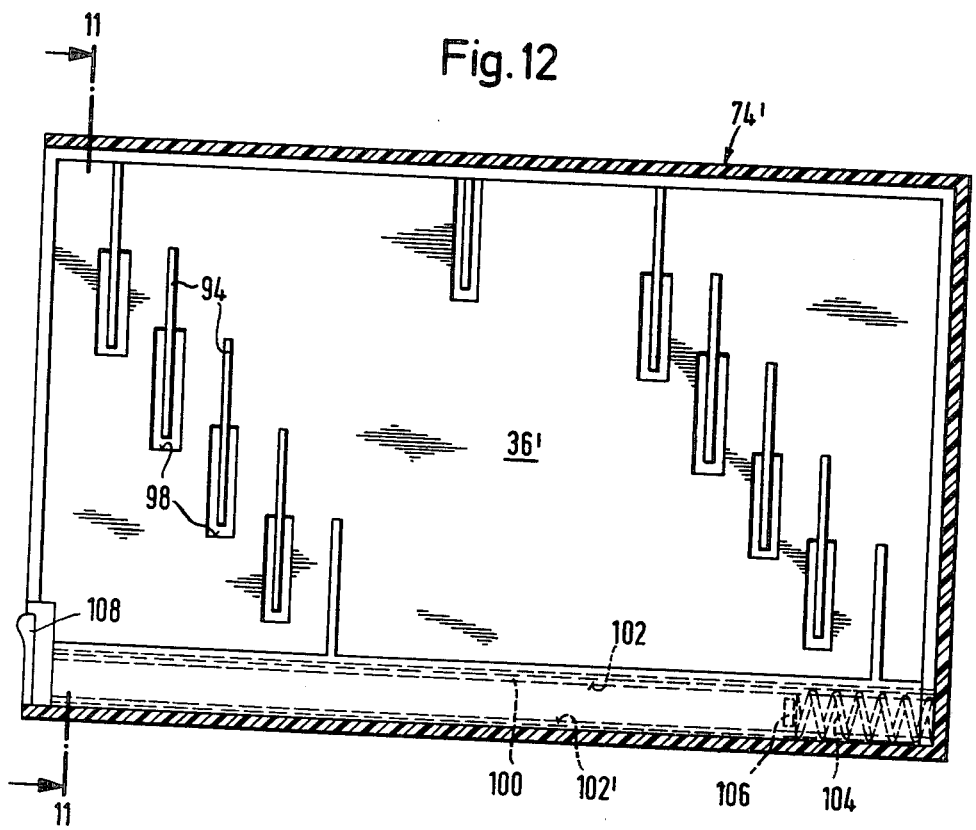
Figure 13:
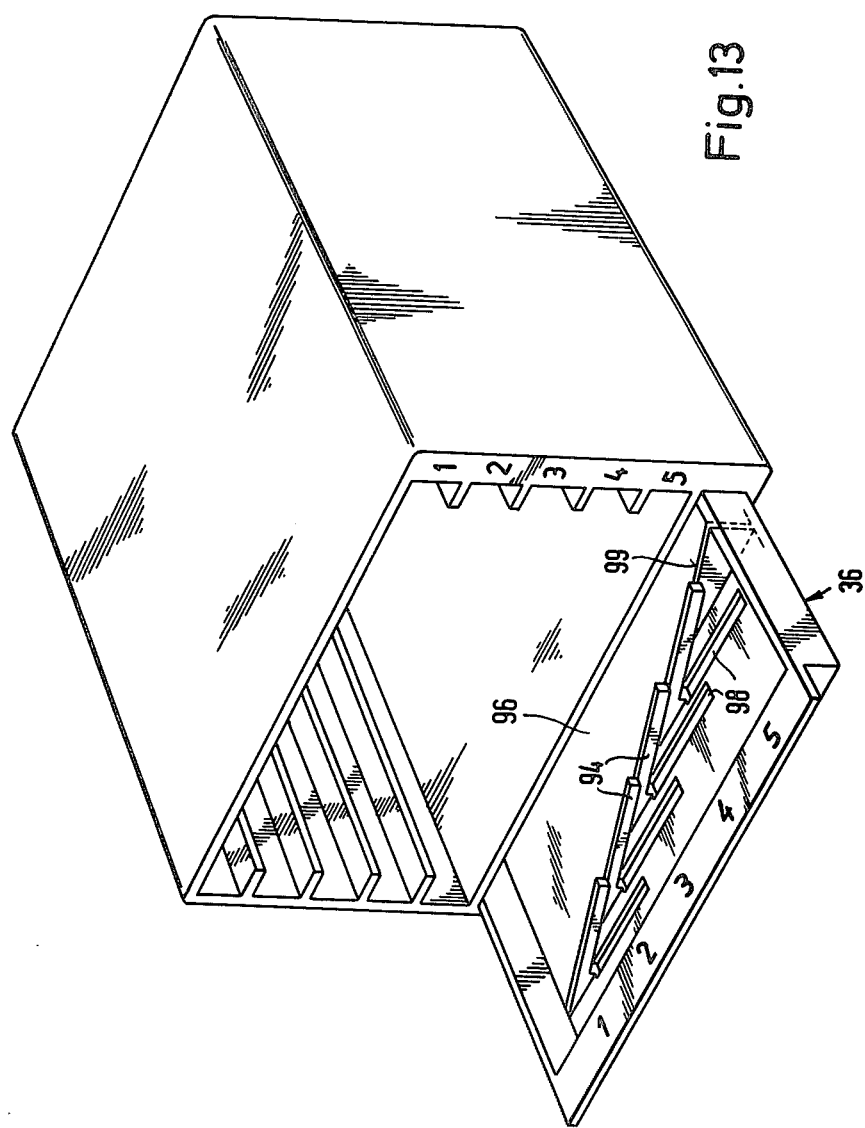

This construction is illustrated in FIGS. 11 and 12. To simplify matters, the basic unit 74' from FIG. 3 is used here; a guide rail 100 which projects upwards from the base 25 is shaped on the base unit, and on its side facing the adjacent side wall 24' is provided with a part-cyclindrical, concave profile 102. In a similar manner, the side wall 24' has on its inside a corresponding concave profile 102'. Both serve as a guide means for a helical spring 104 and guard against it buckling. When the drawer 36' is closed, the spring 104 is compressed between the back wall of the shelving element and a lug 106 which projects from above into the passage formed between the rail 100 and the side wall 24' and which is shaped on the drawer 36'. Stops (not shown) limit the extent of the ejection movement; the release button 108 may be shaped in a manner similar to the button 38 in FIG. 1.

Figure 14:
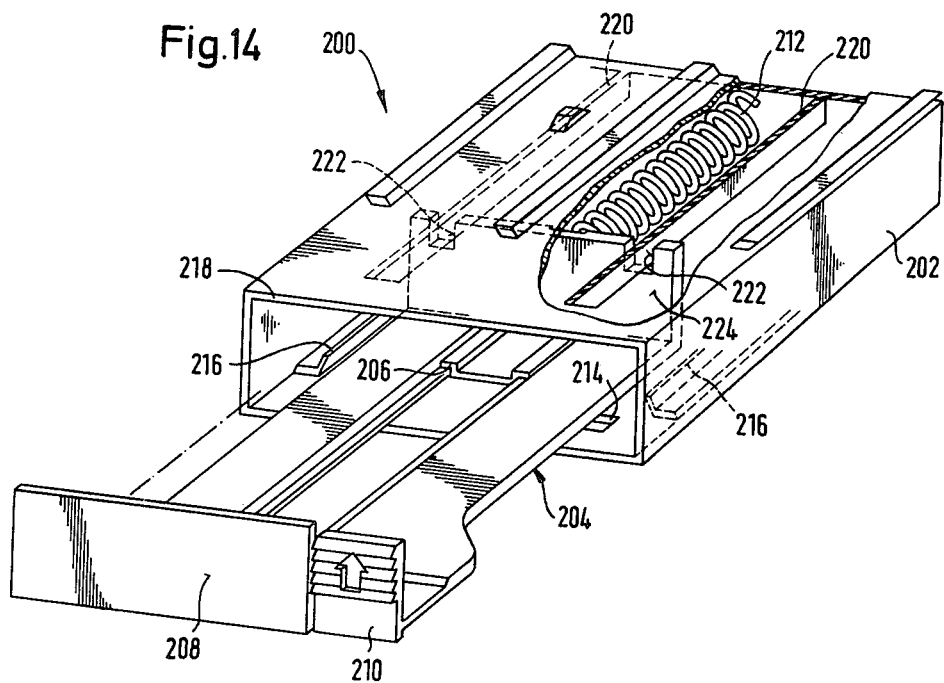

FIGS. 16 to 19 show a further embodiment of the subject of the invention. FIG. 14 shows a shelving element 200 which simultaneously forms the cassette for housing the photographic prints. It comprises a substantially rectangular housing 202 that is open at the front and closed at the back wall and in which a slider member 204, guided by means of an undercut guide means 206, may slide. The slider member includes a front wall 208, at the right-hand side of which there is a button 210; by means of this button it is possible to unlock the slider member, which is pushed out of the housing 202 by a pressure spring 212 but is held by means of a projection shaped on the underside of the button 210 in a recess 214 in the base of the housing.

On the inner side of the housing base there are shaped laterally upright rails 216 on which the prints lie. From the top 218 of the housing similar rails 220 project towards the interior and engage in notches 222 in the back wall 224 of the slider member. In this way the uppermost picture of a pile lying in the housing is prevented from jamming between the rear wall of the slider member and the housing. On the upper and underside of the shelving element there are grooves and rails, respectively, which interlock to form a stack as already explained with reference to FIG. 4.

Figure 15:
FIGS. 15–18 are top plan views of shelving elements of the embodiment of FIG. 14.
Figure 16:
Figure 17:

FIGS. 15, 16 and 17 show in plan view, in substantially schematic form, three such shelving elements for the formats 9×9 cm, 9×11.5 cm and 9×13 cm, respectively. It may be seen that the distance between the particular front wall 208 and the front end of the rails and grooves is the same for all formats. Consequently, as clearly shown in FIG. 19, the fronts of the shelving elements are always flush regardless of their format.

Figure 18:
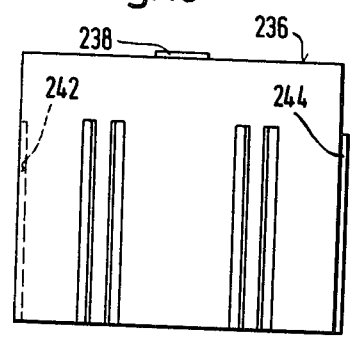

FIG. 18 shows in plan view a similar shelving element to that shown in FIG. 14, but here, however, it is twice as wide and is intended to accommodate drawers. This drawer is shown pulled out in FIG. 19. It consists of a base plate 230, which is divided into two compartments by a ridge 232 running parallel to the width; in each of these compartments there is room for one strip of negatives 234. Unlike the cassettes, in this case no spring mechanism is provided but a pull 238 shaped on or into the front end 236.

Lateral grooves 242 let into the narrow side walls 240 and rails 244 complementary to the groove 242 and shaped on the opposite narrow side wall deserve particular mention. Using this lateral stacking arrangement, stacks of any desired width may be built up, as will readily be seen. Since in any case after a certain number of cassettes in each case a drawer for negatives will again be provided, such a construction also receives the necessary stability.

It is obvious that this kind of lateral stacking can be applied only with certain shelving elements and/or the construction of individual shelving elements of double the width can be applied also with the above-mentioned other embodiments.

I claim:

1. A storage device for photographic prints and negatives therefor, comprising
    a plurality of photographic print storage cassettes to be arranged in stacked relation to each other and individually supported to slide out of the stack, each of the cassettes entirely enclosing such prints therein and having means providing access into the cassette,
    a plurality of sliding drawers arranged beneath and generally parallel to the cassettes, and
    shelving element means defining a plurality of first open front compartments in superposed relation to each other and removably receiving the print storage cassettes therein in stacked relation to each other, the cassettes being supported on support surfaces beneath the compartments and extending from the sides of the compartments, said shelving element means also having framework means surrounding the drawers and having dividing shelves upon which the drawers are slidably supported, and the shelving element means including top and bottom with attaching means for securing to the top and bottom of similar shelving elements.

2. Arrangement according to claim 1, characterised in that the shelving elements is constructed in one piece.

3. The storage device according to claim 1 wherein said plurality of storage cassettes including first and second cassettes, the first cassettes being significantly longer than second cassettes, and said first and second cassettes accommodating photographic prints of lengths corresponding to the lengths of the cassettes, and wherein all the compartments have a depth in a direction rearwardly from the open front which depth corresponds to the length of the second cassettes.

4. The storage device according to claim 1 wherein said plurality of storage cassettes includes first and second cassettes, the first cassettes being significantly longer than said second cassettes, and said first and second cassettes accommodating photographic prints of lengths corresponding to the lengths of the cassettes, and wherein all the compartments have a depth in a direction rearwardly from the open front, which depth corresponds to the length of the first longer cassettes and the enclosure means has stops adjacent the compartments to limit the depth to which the storage cassettes are inserted.

5. The storage device according to claim 1, wherein the shelving element means includes wall means defining the compartments and also frame means confining the drawers therein, the wall means and frame means being detachably assembled to each other and separable from each other.

6. Arrangement according to claim 1, wherein the drawer for negatives has dividing elements to define pockets for negative strips.

7. Arrangement according to claim 6, wherein the dividing elements are formed by an insert consisting of a folded, but dimensionally stable material.

8. Arrangement according to claim 6, wherein the dividing elements are integral with the drawer.

9. Arrangement according to claim 1, and a spring urging the drawer outwardly into open position, and the drawer having a releasable lock retaining the drawer in the shelving element in closed position, the lock being releasable to permit opening of the drawer.

10. Arrangement according to claim 9, wherein the spring is arranged close to one side of the drawer.

11. The storage device according to claim 1, wherein the shelving element means has front faces between the cassette compartments and the sides of the shelving element means, and the storage cassettes having front portions protruding from the open fronts of the compartments, said front portions having sides adjacent the front faces which are exposed in a forwardly direction to facilitate manual gripping of the cassettes.

12. A storage device comprising a plurality of storage cassettes, each containing a pile of several photographic prints and comprising a change-over viewer to accommodate viewing the photographic print at the top of the pile, and each cassette having a housing and a slide therein to effect moving a print contained in the housing, each cassette having a elongate and broad shape comparable to the shape of the photographic prints and having a height significantly less than the length and breadth thereof to accommodate the pile containing several prints, the plurality of cassettes being arranged in stacked relation to each other, a shelving element means having a top and bottom and enclosing walls and defining a plurality of first open front compartments in superposed relation to each other and removably receiving the print storage cassettes therein in said stacked relation to each other, the shelving element means defining cassette support surfaces beneath the compartments and extending from the sides of the compartments, said shelving element means also having dividing shelves in spaced and superposed relation to each other, the shelves defining a second open front compartment in the shelving element means, said first and second compartment being in superposed relation to each other, and an open-topped sliding drawer in the second open front compartment and containing a multiplicity of photographic negatives corresponding to the photographic prints in the print viewing cassettes confined in said first compartments, the cassettes and drawers having fronts adjacent each other at the open fronts of the compartments.

* * * * *